US006973544B2

United States Patent
Berg et al.

(10) Patent No.: US 6,973,544 B2
(45) Date of Patent: Dec. 6, 2005

(54) METHOD AND APPARATUS OF USING GLOBAL SNOOPING TO PROVIDE CACHE COHERENCE TO DISTRIBUTED COMPUTER NODES IN A SINGLE COHERENT SYSTEM

(75) Inventors: Thomas B. Berg, Portland, OR (US); Bruce M. Gilbert, Beaverton, OR (US); Thomas D. Lovett, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 10/045,927

(22) Filed: Jan. 9, 2002

(65) Prior Publication Data

US 2003/0131200 A1 Jul. 10, 2003

(51) Int. Cl.[7] .............................................. G06F 12/00
(52) U.S. Cl. ....................... 711/141; 711/142; 711/143
(58) Field of Search ................................. 711/141–146

(56) References Cited

U.S. PATENT DOCUMENTS

| | | | |
|---|---|---|---|
| 5,297,269 A | * | 3/1994 | Donaldson et al. .......... 711/145 |
| 5,313,609 A | * | 5/1994 | Baylor et al. ................ 711/121 |
| 5,535,365 A | * | 7/1996 | Barriuso et al. ............. 711/155 |
| 5,537,574 A | * | 7/1996 | Elko et al. .................... 711/141 |
| 5,604,882 A | | 2/1997 | Hoover et al. |
| 5,749,095 A | * | 5/1998 | Hagersten .................... 711/141 |
| 5,787,476 A | * | 7/1998 | Laudon et al. ............... 711/141 |
| 5,822,763 A | * | 10/1998 | Baylor et al. ................ 711/141 |
| 5,943,685 A | | 8/1999 | Arimilli et al. |
| 6,006,255 A | * | 12/1999 | Hoover et al. ............... 709/216 |
| 6,065,077 A | | 5/2000 | Fu |
| 6,085,295 A | * | 7/2000 | Ekanadham et al. ......... 711/145 |
| 6,088,769 A | | 7/2000 | Luick et al. |
| 6,421,775 B1 | * | 7/2002 | Brock et al. .................... 713/1 |
| 6,622,215 B2 | * | 9/2003 | Khare et al. ................. 711/141 |

* cited by examiner

*Primary Examiner*—Nasser Moazzami
(74) *Attorney, Agent, or Firm*—Abdy Raissinia

(57) ABSTRACT

A method and apparatus for providing cache coherence in a multiprocessor system which is configured into two or more nodes with memory local to each node and a tag and address crossbar system and a data crossbar system which interconnects all nodes. The disclosure is applicable to multiprocessor computer systems which utilize system memory distributed over more than one node and snooping of data states in each node which utilizes memory local to that node. Global snooping is used to provide a single point of serialization of data tags. A central crossbar controller examines cache state tags of a given address line for all nodes simultaneously and issues an appropriate reply back to a node requesting data while generating other data requests to any other node in the system for the purpose of maintaining cache coherence and supplying the requested data. The system utilizes memory local to each node by dividing such memory into local and remote categories which are mutually exclusive for any given cache line. The disclosure provides support for a third level remote cache for each node.

9 Claims, 20 Drawing Sheets

| Bus 73 Request | Global RC State | Xbar 70 Resp to Req | Xbar 70 Req to Home | Xbar 70 Req to Sharers |
|---|---|---|---|---|
| LCR | Invalid | GO Excl | - | - |
| | Shared Miss | GO | - | - |
| | Dirty Miss | WAIT | - | - |
| | Mod Miss | WAIT Excl | - | - |
| RCR | Invalid | WAIT | LCR | - |
| | Shared Miss | WAIT | LCR | - |
| | Shared Hit | GO | - | - |
| | Shared Both | GO | - | - |
| | Dirty Miss | WAIT | - | - |
| | Dirty Hit | GO | - | - |
| | Dirty Both | GO | - | - |
| | Dirty Mod | GO | - | - |
| | Mod Miss | WAIT | - | - |
| | Mod Hit | GO Excl | - | - |

FIG. 4A

| Xbar 70 Req to Owner | Next Global RC State | RC Allocate and/or Rollout | Comments |
|---|---|---|---|
| - | n/c | NO | Line is Home |
| - | n/c | NO | Clean shared |
| RCR | Shared Miss | NO | Wash dirty to clean |
| RCRI | Invalid | NO | Line owned by another send the line Home |
| - | Shared Hit | YES | Home to shared |
| - | Shared Both | YES | Add req to sharing list |
| - | n/c | NO | Read hit |
| - | n/c | NO | Read hit |
| RCR | Dirty Both | YES | Add req to sharing list |
| - | n/c | NO | Read hit |
| - | n/c | NO | Read hit |
| - | n/c | NO | Read hit |
| RCR | Dirty Hit | YES | Add req to sharing list |
| - | n/c | NO | Allow L2 cache to be E state |

FIG. 4B

|  |  | B |  |  |
|---|---|---|---|---|
| LCRI (109) | Invalid | GO | - | - |
|  | Shared Miss | GO inv=n | - | n*RCI |
|  | Dirty Miss | WAIT inv=n | - | n*RCI |
|  | Mod Miss | WAIT | - | - |
| RCRI | Invalid | WAIT | LCRI | - |
|  | Shared Miss | WAIT inv=n | LCRI | n*RCI |
|  | Shared Hit | GO inv=1 | LCI | - |
|  | Shared Both | GO inv=n+1 | LCI | n*RCI |
|  | Dirty Miss | WAIT inv=n | - | n*RCI |
|  | Dirty Hit | GO inv=1 | - | - |
|  | Dirty Both | GO inv=n+1 | - | n*RCI |
|  | Dirty Mod | GO inv=n | - | n*RCI |
|  | Mod Miss | WAIT | - | - |
|  | Mod Hit | GO | - | - |

(rightmost brace: D)

FIG. 4C

|   |   | C |   |   |
|---|---|---|---|---|
| | - | n/c | NO | Already home |
| | - | Invalid | NO | Shared to home |
| | RCRI | Invalid | NO | Send the line home |
| | RCRI | Invalid | NO | Send the line home |
| | - | Mod Hit | YES | Line was home |
| | - | Mod Hit | YES | Line was shared |
| D | - | Mod Hit | NO | Line was shared |
| | - | Mod Hit | NO | Line was shared |
| | RCRI | Mod Hit | YES | Line was dirty, owner replies |
| | RCI | Mod Hit | NO | Use own shared copy |
| | RCI | Mod Hit | NO | Use own shared copy |
| | - | Mod Hit | NO | Use own modified copy |
| | RCRI | Mod Hit | YES | Owner returns line |
| | - | n/c | NO | Already modified exclusively |

FIG. 4D

| Bus 73 Request | Global RC State | Xbar 70 Resp to Req | Xbar 70 Req to Home | Xbar 70 Req to Sharers |
|---|---|---|---|---|
| LUR | Invalid | GO | - | - |
| | Shared Miss | GO | - | - |
| | Dirty Miss | Wait | | |
| | Mod Miss | Wait | - | - |
| RUR | Invalid | Wait | LUR | - |
| | Shared Miss | Wait | LUR | |
| | Shared Hit | GO | - | |
| | Shared Both | GO | - | - |
| | Dirty Miss | WAIT | - | - |
| | Dirty Hit | GO | - | - |
| | Dirty Both | GO | - | - |
| | Dirty Mod | GO | - | - |
| | Mod Miss | WAIT | - | - |
| | Mod Hit | GO | - | - |

| Xbar 70 Req to Owner | Next Global RC State | RC Allocate and/or Rollout | Comments |
|---|---|---|---|
| -   | n/c | NO | |
| -   | n/c | NO | |
| RUR | n/c | NO | |
| RUR | n/c | NO | |
| -   | n/c | NO | |
| -   | n/c | NO | |
| -   | n/c | NO | |
| -   | n/c | NO | |
| RUR | n/c | NO | |
| -   | n/c | NO | |
| -   | n/c | NO | |
| -   | n/c | NO | |
| RUR | n/c | NO | |
| -   | n/c | NO | |

| Bus 73 Request | Global RC State | Xbar 70 Resp to Req | Xbar 70 Req to Home | Xbar 70 Req to Sharers | Xbar 70 Req to Owner | Next Global RC State | RC Allocate and/or Rollout | Comments |
|---|---|---|---|---|---|---|---|---|
| LUW (partial) | Invalid | GO | - | - | - | n/c | NO | |
| | Shared Miss | GO inv=n | - | n*RCI | - | Invalid | NO | |
| | Dirty Miss | WAIT inv=n | - | n*RCI | RCRI | Invalid | NO | |
| | Mod Miss | WAIT | - | - | RCRI | Invalid | NO | |
| RUW (partial) | Invalid | WDAT | LRMW | - | - | n/c | NO | Get it from Home, then send it back |
| | Shared Miss | WDAT inv=n | LRMW | n*RCI | - | Invalid | NO | Get it from Home, then send it back |
| | Shared Hit | GO inv=1 | LCI | n*RCI | - | Mod Hit | NO | Upgrade from Shared to Mod |
| | Shared Both | GO inv=n+1 | LCI | n*RCI | - | Mod Hit | NO | Upgrade from Shared to Mod |
| | Dirty Miss | WDAT inv=n | LWB | n*RCI | RCRI | Invalid | NO | Get it from Owner, then send it Home |
| | Dirty Hit | GO inv=1 | - | - | RCI | Mod Hit | NO | Upgrade from Dirty to Mod |
| | Dirty Both | GO inv=n+1 | - | n*RCI | RCI | Mod Hit | NO | Upgrade from Dirty to Mod |
| | Dirty Mod | GO inv=n | - | n*RCI | - | Mod Hit | NO | Upgrade from Dirty to Mod |
| | Mod Miss | WDAT | LWB | - | RCRI | Invalid | NO | Get it from Owner, then send it Home |

| | State | | | | A | | | |
|---|---|---|---|---|---|---|---|---|
| LUW (full line) | Mod Hit | GO | - | - | - | n/c | NO | Ready as is |
| | Invalid | GO | - | - | - | n/c | NO | Already Home |
| | Shared Miss | GO inv=n | - | n*RCI | - | Invalid | NO | Invalidate Sharers |
| | Dirty Miss | GOnP7 inv=n+1 | - | n*RCI | RCI | Invalid | NO | Invalidate Mod line at Owner and Sharers |
| | Mod Miss | GOnP7 inv=1 | - | - | RCI | Invalid | NO | Invalidate Mod line at Owner |
| RUW (full line) | Invalid | WTGT inv=1 | LUW | - | - | n/c | NO | Write to Home |
| | Shared Miss | WTGT inv=n+1 | LUW | n*RCI | - | Invalid | NO | Invalidate owner and write to Home |
| | Shared Hit | GO inv=1 | LCI | - | - | Mod Hit | NO | Invalidate Home and upgrade your S to M |
| | Shared Both | GO inv=n+1 | LCI | n*RCI | - | Mod Hit | NO | Invalidate Home and other RC's upgrade your S to M |
| | Dirty Miss | WTGT inv=n+1 | LWB | n*RCI | RCI | Invalid | NO | Invalidate all RC's and write to Home |
| | Dirty Hit | GO inv=1 | - | - | RCI | Mod Hit | NO | Invalidate owner's RC and upgrade your S to M |
| | Dirty Both | GO inv=n+1 | - | n*RCI | RCI | Mod Hit | NO | Invalidate all other RC's and upgrade your S to M |
| | Dirty Mod | GO inv=n | - | n*RCI | - | Mod Hit | NO | Invalidate other RC's and update own RC |
| | Mod Miss | WTGT inv=1 | LWB | - | RCI | Invalid | NO | Invalidate owner and write to Home |
| | Mod Hit | GO | - | - | - | n/c | NO | Update own RC |

| Bus 73 Request | Xbar 70 Resp to Req | Xbar 70 Req to Target | Xbar 70 Req to Others | Comments |
|---|---|---|---|---|
| MMR | WAIT | MMR | - | Remote MMIO or CSR |
| MMW | WTGT inv=1 | MMW | - | Remote MMIO or CSR |
| INTR | WTGT inv=1 | INTR | - | Remote interrupt |
| TLBP | TLBR inv=all-1 | TLBP | TLBP | Purge TLB to all in partition |
| SYNC bit has been set | | SYNC w/o ttrid | SYNC w/o ttrid | SYNC to all in partition clear SYNC bit |
| any request with abort | - | | - | Any request that is aborted will be ignored |

FIG. 7

| Bus 73 Request | Global RC State of Y | Xbar 70 Req to Home | Xbar 70 Req to Instig. | Xbar 70 Req to Sharers |
|---|---|---|---|---|
| RC instigates request of line X s rollout of line Y | Shared Hit | CI | RCI | - |
| | Shared Both | CI | RCI | - |
| | Dirty Hit | - | RCI | - |
| | Dirty Both | - | RCI | - |
| | Dirty Mod (>1 sharer) | - | RCI | CI to new owner |
| | Dirty Mod (1 sharer) | - | RCI | CI to new owner |
| | Mod Hit | LWB | RCRI | - |

| Xbar 70 Req to Owner | Next Global RC State of Y | Comments |
|---|---|---|
| - | Invalid | Invalidate only read copy. |
| - | Shared Miss | Another read copy still exists. |
| CI | Mod Miss | Invalidate only read copy of dirty line-only owner still exists. |
| CI | Dirty Miss | Requester's shared copy is invalidated, line remains dirty. |
| - | Dirty Miss | Another sharer exists after upgrading a sharer to an owner - choose new owner. |
| - | Mod Miss | Upgrade only sharer to be new owner. |
| - | Invalid | Only copy is modified - line is written home. |

| Mnemonic | Code | Description | Q/A |
|---|---|---|---|
| LUR | 00100 | request for a local uncached read (either partial or full) | Q |
| LUW | 00101 | request for a local uncached write (either partial or full) | Q |
| GO | 00110 | reply to Control agent 66 that validates speculative access with bus 76 | A |
| GOnP7 | 00111 | reply to Control agent 66 that validates speculative access without bus 76 | A |
| LCR | 01000 | request for a cached read to a local address | Q |
| LRMW | 01001 | request to Control agent 66 for a cached read-modify-write | Q |
| WAIT | 01011 | reply to Control agent 66 canceling speculative access, Data Crossbar 72 completion | A |
| LCRI | 01100 | request for a cached read-invalidate to a local address | Q |
| LCI | 01100 | LCRI request where all BE are zero, an invalidate | Q |

FIG. 9A

| | | | |
|---|---|---|---|
| LWB | 01101 | request to Control agent 66 for full local line cached writeback | Q |
| ERR | 01111 | reply to Control agent 66 that cancels the request and posts an error | A |
| SYNC | 10000 | request to Control agent 66 that synchronizes the microsecond clock | Q |
| RTRY | 10001 | reply to Control agent 66 that cancels the request, it must be retried | A |
| WDAT | 10010 | reply to Control agent 66 for a partial write request, returns target info | A |
| WTGT | 10011 | reply to Control agent 66 for a full line write request, returns target info | A |
| RUR | 10100 | request for a remote uncached read (either partial or full line) | Q |
| RUW | 10101 | request to crossbar 70 for remote uncached write (partial or full) | Q |
| MMR | 10110 | request for a memory-mapped read | Q |

FIG. 9B

| | | | |
|---|---|---|---|
| MMW | 10111 | request for a memory-mapped write | Q |
| RCR | 11000 | request for a cached read to a remote address | Q |
| CI | 11010 | request to Control agent 66 to collect invalidate acknowledges | Q |
| INTR | 11011 | request to forward an interrupt to the target quad | Q |
| RCRI | 11100 | request for a cached read-invalidate to a remote address | Q |
| RCI | 11100 | RCRI request where all BE are zero, an invalidate | Q |
| TLBP | 11101 | request for a TLB purge, only one active at a time | Q |
| TLBR | 11110 | reply to a prior TLBP request, only one active at a time | A |
| ABRT | 11111 | request started by Control agent 66 is aborted, ignore 1st half-transfer | Q |

FIG. 9C

METHOD AND APPARATUS OF USING GLOBAL SNOOPING TO PROVIDE CACHE COHERENCE TO DISTRIBUTED COMPUTER NODES IN A SINGLE COHERENT SYSTEM

CROSS-REFERENCE TO RELATED APPLICATIONS

The following patent applications, all assigned to the assignee of this application, describe related aspects of the arrangement and operation of multiprocessor computer systems according to this invention or its preferred embodiment.

U.S. patent application Ser. No. 10/045,798 by T. B. Berg et al. (BEA919990003US1) entitled "Increased Computer Peripheral Throughput By Using Data Available Withholding" was filed on Jan. 9, 2002.

U.S. patent application Ser. No. 10/045,821 by T. B. Berg et al. (BEA920000018US1) entitled "Multi-level Classification Method For Transaction Address Conflicts For Ensuring Efficient Ordering In A Two-level Snoopy Cache Architecture" was filed on Jan. 9, 2002.

U.S. patent application Ser. No. 10/045,564 by S. G. Lloyd et al. (BEA920000019US1) entitled "Transaction Redirection Mechanism For Handling Late Specification Changes And Design Errors" was filed on Jan. 9, 2002.

U.S. patent application Ser. No. 10/045,797 by T. B. Berg et al. (BEA920000020US1) entitled "Method And Apparatus For Multi-path Data Storage And Retrieval" was filed on Jan. 9, 2002.

U.S. patent application Ser. No. 10/045,923 by W. A. Downer et al. (BEA920000021US1) entitled "Hardware Support For Partitioning A Multiprocessor System To Allow Distinct Operating Systems" was filed on Jan. 9, 2002.

U.S. patent application Ser. No. 10/045,925 by T. B. Berg et al. (BEA920000022US1) entitled "Distributed Allocation Of System Hardware Resources For Multiprocessor Systems" was filed on Jan. 9, 2002.

U.S. patent application Ser. No. 10/045,926 by W. A. Downer et al. (BEA920010030US1) entitled "Masterless Building Block Binding To Partitions" was filed on Jan. 9, 2002.

U.S. patent application Ser. No. 10/045,974 by W. A. Downer et al. (BEA920010031US1) entitled "Building Block Removal From Partitions" was filed on Jan. 9, 2002.

U.S. patent application Ser. No. 10/045,796 by W. A. Downer et al. (BEA920010041US1) entitled "Masterless Building Block Binding To Partitions Using Identifiers And Indicators" was filed on Jan. 9, 2002.

BACKGROUND OF THE INVENTION

1. Technical Field

The present invention relates generally to computer data cache schemes, and more particularly to a method and apparatus for maintaining coherence between memories within a system having distributed shared memory when such system utilizes multiple data processors capable of being configured into separate, independent nodes in a system utilizing non-uniform memory access (NUMA) or system memory which is distributed across various nodes.

2. Description of the Related Art

In computer system designs utilizing more than one processor operating simultaneously in a coordinated manner, system memory which may be physically configured or associated with one group of such processors is accessible to other processors or processor groups in such system. Because of the demand for greater processing power within data processing systems, and due to the desire to have relatively small microprocessors work cooperatively sharing system components as a multi-processing system, there have been many attempts over the last several years to solve the problems inherent in maintaining coherence between memory devices which are accessible to more than one processing device or more than one system node when such nodes include multiple processors which share resources and/or hardware devices local to the node.

The coherence problem is exemplified by a system in which an interconnected crossbar communications channel is used to connect a plurality of memory devices, each memory device paired with an associated processor or a local group of processors forming a multi-processor system. A read or write data request from a processor or group of processors acting as one node in such a multi-node system may be directed to addresses which are within memory devices associated with the requesting processor or within a memory associated with another of the processor groups within the system. Each processor group is also associated with a local cache. Since each processor group has an associated cache, and each cache may have more than one level, care must be taken to ensure the coherence of the data that is maintained throughout the system.

One way to ensure that coherence is maintained is track the state of each item of data in a directory (or register) which points to each non-local cache in which the data resides. By knowing the location of each copy of the data, each copy can either be updated, or a notation can be made within the register to indicate that the data at one or more locations is out-of-date. Such registers or tables require pointers to multiple nodes which are caching data. All of this has the effect of slowing down system speed and therefore performance, because of component latency and because the ability of certain systems to process multiple data lines simultaneously while waiting for data state indicators from other memory subsystems local to other system processors is not fully utilized.

In patents found in the related art, a problem observed with maintaining one table which points to each copy of a particular item of data within each node, is that it increased the complexity and the width of directory entries within such tables, making the table relatively large and complex.

U.S. Pat. No. 6,088,769, issued to Luick et al., discloses a multiprocessor cache coherence directed by combined local and global tables. While this reference defines a single global snooping scheme, it relies on a single directory, and the L1 and L2 caches filter data references so that only some of such references reach the central global control unit. Luick does not teach global snooping of all data references by all processors in a multiprocessor system by a single level central control device which facilitate communications between multiple nodes in a multi-node processor system. Further, while Luick discloses checking data references against a private directory that is local to a particular node, it does not teach checking data references in a single global cache coherence table. Also, the Luick reference describes handling a cache coherence in a single processor generating data tags or references and does not teach its use in a multiple processor cluster which generates data tags in a node which contains its own memory and input/output capabilities that can function as a stand alone processing system without the need to communicate through a central control device which also acts as a communications channel to other independent processor nodes.

U.S. Pat. No. 6,065,077, issued to Fu, teaches a method for sharing data caches where all the memory and processor devices are separately connected to a flow control unit which acts as crossbars between the processor and memory elements, and communicates with other crossbar or communication systems which themselves control their subsystem components. Fu does not teach a system which serves to coordinate data across a multiprocessor system, which itself utilizes multiple processors within a group or node which is capable of acting independently of a central control device or crossbar system if necessary. The method in Fu requires all references to memory be satisfied by transferring such data from a memory unit through a flow control device acting as a crossbar to the requesting data processing unit. Fu does not teach a system whereby requested data by a processor could be satisfied totally by local memory to the particular node requesting such data, and does not teach a method by which only data requests with coherence implications are transferred between nodes.

Another reference which disclose other methods of keeping track of the data maintained in various cache throughout a system are found in U.S. Pat. No. 5,943,685, issued to Arimilli et al., for a method of shared intervention of a single data provider among shared caches. U.S. Pat. No. 5,604,882, issued to Hoover, et al., describes a system and method that the cache is for empty notification from peer cache units to global storage control units in a multiprocessor system. The related background art does not teach the use of a central communications or control device which forwards results from one node to another node in a multi-node system by simultaneously providing a read request to a first node and a write request to the second node with the results of the read request communicated to that second node without going through the central control or communications device which communicates the data tagging and addressing information to the various nodes.

Accordingly, it is an object of the present invention to provide a system and method for maintaining coherence of data stored in multiple caches within a multiprocessor system which utilizes a central tag and address crossbar as a central communications pathway wherein the central device is not required to maintain transitional or transient states for pending cache-related data requests in the system. It is further an object of the present invention to provide a system and method for maintaining coherence of data stored in multiple caches in separate system nodes within a multiprocessor system having at least two nodes, wherein a data requester node is returned results of such a request from the target node storing requested data without being processed through the central control device.

It is yet another object of the present invention to provide a system and method for maintaining coherence of data stored in multiple caches located in separate nodes within a multi-node multiprocessor system which utilizes a data tag and address crossbar control and communications device wherein the central device controlling communications of tag or address information from a first node to a second node simultaneously sends a read request to a first node and a data write request to the second node with the results of the data read request being communicated to such second node without transmission through the tag and address crossbar.

SUMMARY OF THE INVENTION

The present invention provides a method and apparatus for use in computer systems utilizing distributed computational nodes where each node consists of one or more microprocessors and each node is capable of operating independently with local system memory and control systems, where all the nodes are interconnected to allow operation as a multi-node system. The method provides for maintaining cache coherence in multiprocessor systems which have a plurality of nodes coupled by an interconnecting communications pathway such as a tag and address crossbar system and a data crossbar system. The method operates with a tag and address crossbar system which is capable of storing information regarding the location and state of data within the system when the system also includes the capability to access data from the memory system of any node. The method includes the steps of storing information regarding the state of data in said interconnecting pathway; checking said stored information to determine the location of the most current copy of a requested portion of data, in response to a request by a requesting node for the requested portion of data; retrieving said current copy of requested portion of data and directing said data to the requesting node; checking said stored information to determine the location of the requested data; and then directing the system to send said requested data to the requesting node without going through the said interconnecting communications pathway.

The apparatus includes a multiprocessor system comprised of two or more nodes of at least one processor each, each node including part of a shared, distributed memory system used by the processors. The nodes are interconnected by a communications pathway which includes means to store the location and state of data stored across the system in the distributed memory. The preferred embodiment reduces latency in data flow throughout the system by storing the location and state of requested data or other location and state information in a tag and address crossbar device which examines cache line states for each line in all nodes simultaneously. Appropriate replies back to a node requesting data or other requests are then issued based on such information stored in the tag and address crossbar system which is acting as the communications pathway between the nodes.

Other features and advantages of this invention will become apparent from the following detailed description of the presently preferred embodiment of the invention, taken in conjunction with the accompanying drawings.

BRIEF DESCRIPTION OF THE DRAWINGS

FIGS. 4A–4D is a table illustrating the various states of cached reads and read-invalidates used in the preferred embodiment.

FIGS. 5A–5B is a table illustrating uncached read requests in the system used in the preferred embodiment.

FIGS. 6A–6B is a table illustrating uncached writes requests in the system used in the preferred embodiment.

FIG. 7 is a table illustrating reads and writes to memory mapped input/output, CSRs, and non-memory targets in the system used in the preferred embodiment.

FIGS. 8A–8B is a table illustrating rollout requests in the system used in the preferred embodiment.

FIGS. 9A–9C is a table of the mnemonics for the fields used for all the input and output buses for for the tag and address crossbar apparatus as used in the preferred embodiment and provides the references used in FIGS. 4, 5, 6, 7 and 8.

DETAILED DESCRIPTION OF THE PREFERRED EMBODIMENT

Overview and Technical Background

Figure 1:
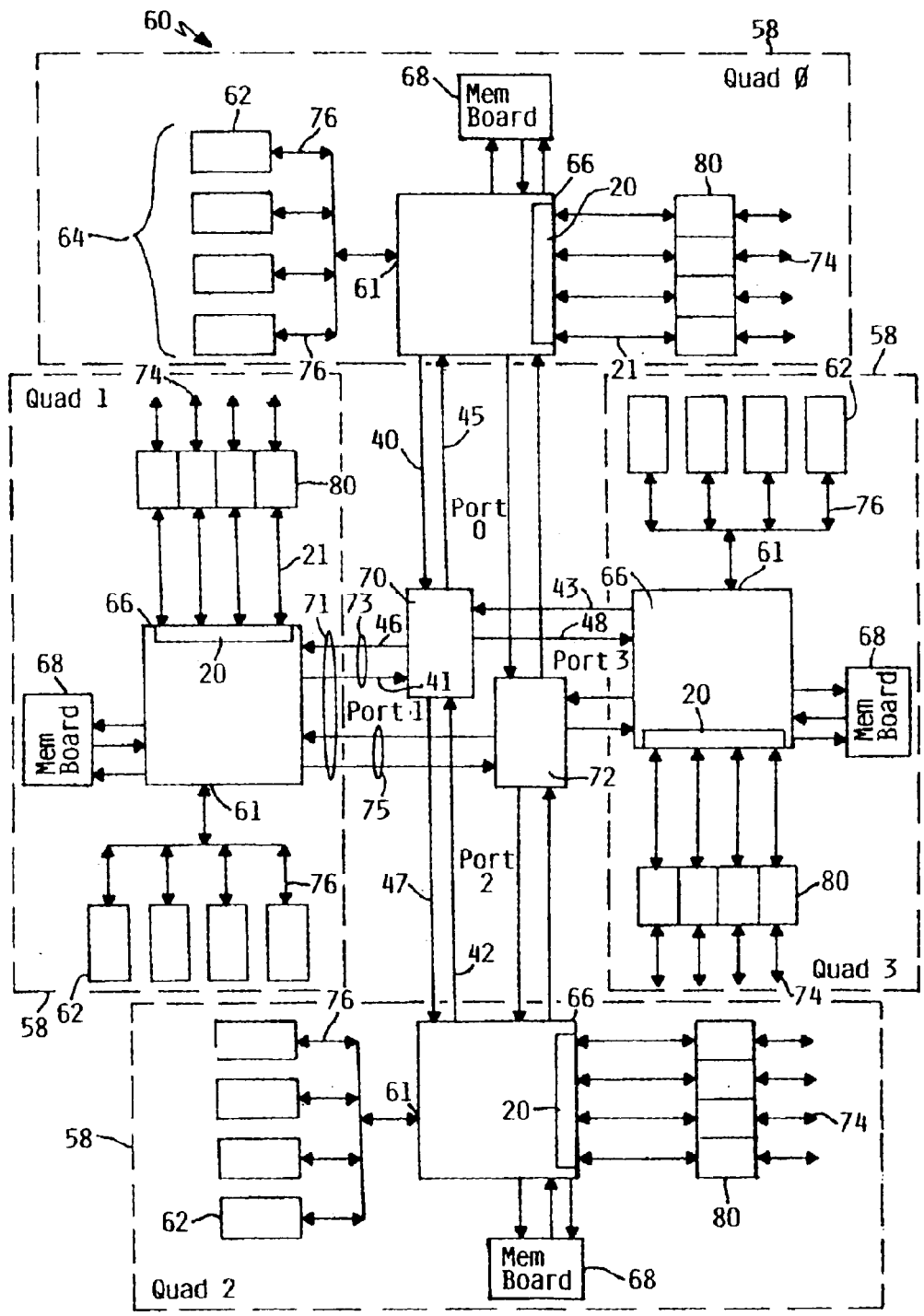
FIG. 1 is a block diagram of a typical multiprocessor system utilizing a tag and address crossbar system in conjunction with a data crossbar system which operates with the present invention and is suggested for printing on the first page of the issued patent.

The present invention relates specifically to an improved data handling method for use in a multiple processor system, configured in two or more independent processing nodes, which utilizes a tag and address crossbar system for use in combination with a data crossbar system, together comprising a data processing system to process multiple data read and write requests across the nodes. In such systems, a particular processor or node cannot know the cache line states of data that exist on other nodes, they need to access the latest copy of such data within the memory of other nodes for the system to operate coherently. In such multinode systems, a method for system-wide cache coherency must be adopted by assure that a data cache line is current for a microprocessor or node that requests a given data cache line. The system disclosed provides a hierarchy of serialization of any requests to a given cache line before allowing any node in the system to access that cache line so that cache coherence is maintained throughout all nodes in the system which may be operating together.

The method and apparatus described utilizes global snooping to provide a single point of serialization. Global snooping is accomplished in the invention by providing that all nodes within the system pass all requests for data to a centralized controller which communicates with each node in the system and maintains centralized cache state tags. The central controller, which is a data tag and address crossbar system interconnecting the nodes, examines the cache state tags of each line for all nodes simultaneously, and issues the appropriate reply back to a node which is requesting data. The controller also generates other requests to other nodes for the purpose of maintaining cache coherence and supplying the requested data if appropriate.

The preferred embodiment divides all of the system's memory space, associated with each node of one or more microprocessors, into local and remote categories for each node. Each node owns a unique portion of the total memory space in the entire system, defined as local to that node. The total of all system memory is completely owned by exactly one of the collection of nodes in the system. Local and remote categories for any cache line are mutually exclusive, whereby all cache lines in the system that are not local to a node are therefore defined as remote to that node. The invention provides support for a third level remote cache for each node of the system, wherein each node caches remote data lines specified by the controller. Each memory board associated with each node or group of processors is itself divided into local memory, with a portion of the memory being defined as remote cache. The portion of each local memory system defined as remote cache is operating as a third level cache. The invention provides for anticipation of a requested data line by providing a means for the system to know in advance whether a requested line may be located in local memory for a particular node, or the portion of the local memory which is defined as remote cache which may be caching another node's local memory.

The disclosure provides that each node in the system may request data either from local memory or remote cache memory when a request for such data is made since the controller knows in which category the line is defined and the controller can either verify or deny the use of the anticipated data line when it has completed its coherency checks. If the subject data line that was anticipated and read in advance is coherent, then the node requesting the data can use that line. If the line is not coherent, then the controller will have forwarded a request to the appropriate node, and the requesting node discards the anticipated data line and uses instead the line return due to the request made by the controller.

The use of a remote cache is provided to reduce the latency of cache lines that would otherwise have to be obtained from another node in the system. The existence of the disclosed remote cache provides coherency states that eliminate the need for some node to node data transmission by allowing "dirty" cache lines to exist in nodes as read only copies. The existence of such "dirty" read only cache lines held in the remote cache delays the time when the cached line must be restored to its original memory location, thus enhancing the possibility that other cache state transitions will eliminate the need to restore the cache line to its original memory location thus saving otherwise unnecessary system transactions which cause delay by a system expenditure of bandwidth. If such remote cache evicts such a "dirty" data line, and the system node evicting the nominal owner of that data line, the controller reassigns a different sharing node as the new owner of that data line without any actual data movement within the system. If no node shares the data other than the node evicting the "dirty" line, then the line is restored to its memory location.

In the invention, system memory is defined for a given computational node as the aggregate memory of all nodes allocated to a partition within the system which the given node is a member. Therefore, in systems in which more than one partition of computational nodes exist, the invention and system described operate on, and allocate the system memory only across those nodes defined as operating within a single partition within the system.

Details of the Preferred Embodiment

FIG. 1 presents an example of a typical multiprocessor systems in which the present invention may be used. FIG. 1 illustrates a multi-processor system which utilizes four separate central control systems (control agents) 66, each of which provides input/output interfacing and memory control for an array 64 of four Intel brand Itanium class microprocessors 62 per control agent 66. In many applications, control agent 66 is an application specific integrated circuit (ASIC) which is developed for a particular system application to provide the interfacing for each microprocessors bus 76, each memory 68 associated with a given control agent 66, PCI interface bus 21, and PCI input/output interface 80, along with the associated PCI bus 74 which connects to various PCI devices. Bus 76 for each microprocessor is connected to control agent 66 through bus 61. Each PCI interface bus 21 is connected to each control agent 66 through PCI interface block bus 20.

FIG. 1 also illustrates the port connection between the tag and address crossbar 70 as well as data crossbar 72. As can be appreciated from the block diagram shown in FIG. 1, crossbar 70 and crossbar 72 allow communications between each control agent 66, such that addressing information and memory line and write information can be communicated across the entire multiprocessor system 60. Such memory addressing system communicates data locations across the system and facilitates update of control agent 66 cache information regarding data validity and required data location.

A single node or "quad" processor group 58 is comprised of microprocessors 62, memory 68, and control agent 66. In multiprocessor systems to which the present invention relates, quad memory 68 is usually Random Access Memory (RAM) available to the local control agent 66 as local or home memory. A particular memory 68 is attached to a particular controller agent 66 in the entire system 60, but is considered remote memory when accessed by another quadrant or control agent 66 not directly connected to a particular memory 68 associated with a particular control agent 66. A microprocessor 62 existing in any one quad 58 may access memory 68 on any other quad 58. NUMA systems typically partition memory 68 into local memory and remote memory for access by other quads, the present invention enhances the entire system's ability to keep track of data when such data may be utilized or stored in memory 68 which is located in a quad 58 different from and therefore remote from, quad 58 which has a PCI device which may have issued the data.

Figure 3:
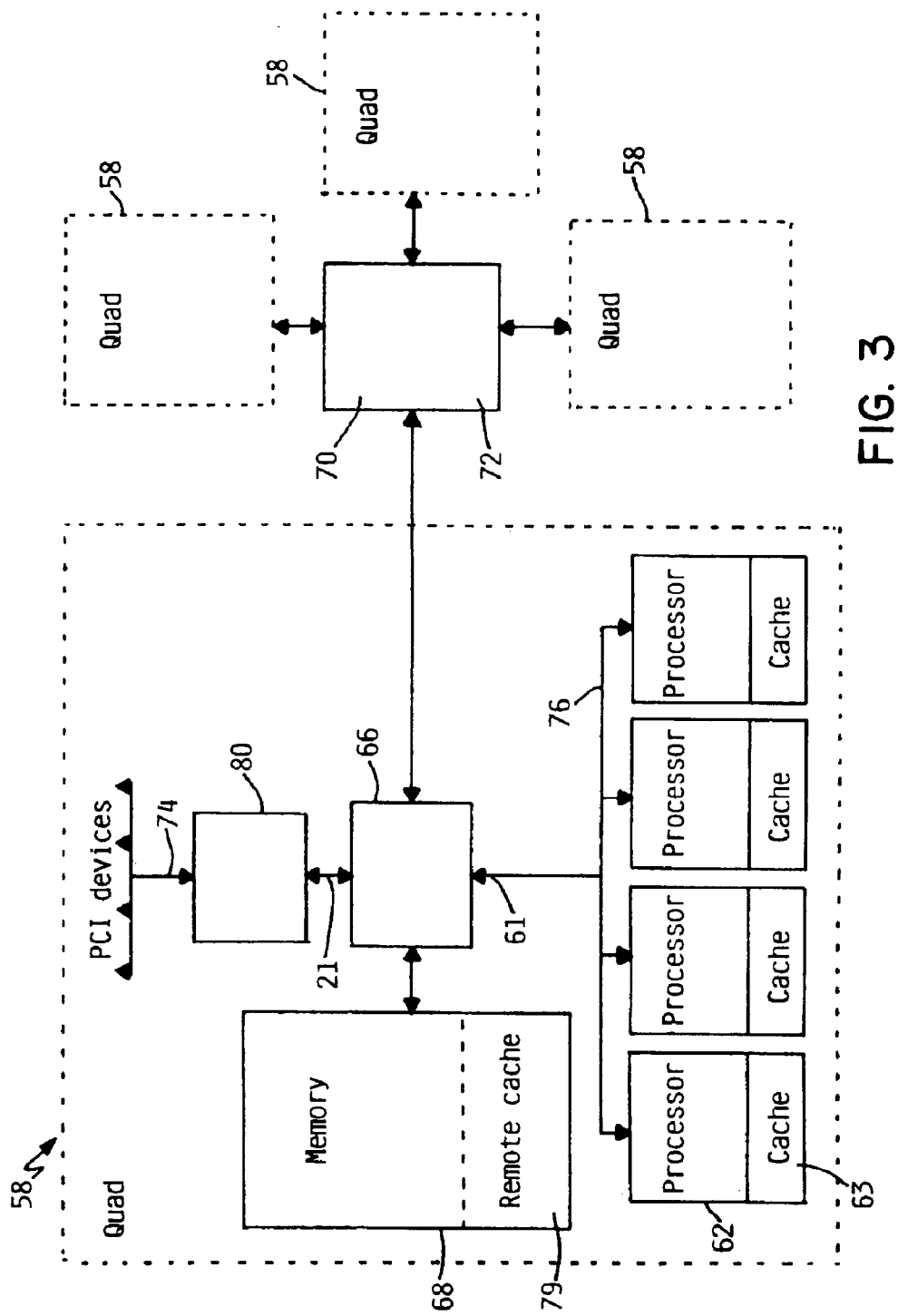
FIG. 3 is a block diagram of one quad processor group illustrating functional components of one group and the relationship of cache and remote cache memory in the present invention.

FIG. 3 is a different view of the same multiprocessor system shown in FIG. 1 in a simpler view, illustrating one quad 58 in relation to the other quad components as well as crossbar system 70 and 72 illustrated for simplicity as one unit in FIG. 3. The invention disclosed defines a certain portion of memory 68 located in each node or quad 58 as remote cache 79. The portion of memory 68 operating as local memory acts as home memory for the particular quad 58 in which it is associated, while remote cache 79, part of memory board 68 but defined as a remote cache, operates as a remote cache for other nodes in the system. As can be seen on FIG. 3, remote cache 79 is different than cache 63 which is normally associated with a particular processor 62. Cache 63 is normally on the same substrate or chip of processor 62 and can be divided into what is often referred to as level 1 (L1) and level 2 (L2) cache.

The tag and address crossbar 70 and data crossbar 72 allow the interfaces between four memory control agents 66 to be interconnected as shared memory common operating system entities, or segregated into separate instances of shared memory operating system instances if the entire system is partitioned to allow for independently operating systems within the system disclosed in FIG. 1. The tag and address crossbar 70 supports such an architecture by providing the data address snoop function between the microprocessor bus 76 on different quads 58 that are in a common operating system instance (partition). In support of the snoop activity, the tag and address crossbar 70 routes requests and responses between the memory control agents 66 of the quads 58 in a partition. Each partition has its own distinct group of quads 58 and no quad can be a part of more than one partition. Quads of different partitions do not interact with each other's memory space; the invention will be described below with the assertion that all quads in the system are operating within a single system partition.

Tag and address crossbar 70 receives inbound requests across each crossbar 70 bus, shown as a single instance 41 for port 1 in FIG. 1. Tag and address crossbar 70 processes inbound data requests in either the even tag pipeline 52 or odd pipeline 53 detailed in FIG. 2., sends a reply back on output 46 to the requesting quad 58, and sends outbound data request(s) to other tag and address crossbar 70 output busses, 45, 47 or 48, if necessary. Tag and address crossbar 70 allocates Transaction Identifications (TrIDs) for its outbound requests for each destination memory control agent 66 and for an eviction to the requesting node if necessary. The memory control agents 66 releases such TrIDs for reallocation when appropriate. The tag and address crossbar 70 reply to a memory control agents 66 request for data does not necessarily complete the transaction. If the target address for requested data is local to the requesting quad 58 and no remote caches hold the line as modified, then the tag and address crossbar 70 replies with GO, (as shown in the tables of FIGS. 4, 5 and 6), and memory control agent 66 uses data from its local memory 68 to complete the read to the processor 62 requesting the data.

If the data is modified in another quad's remote cache, then tag and address crossbar 70 replies with WAIT, and the requesting memory control agents 66 suspends the request until the data crossbar 72 supplies read data. When the Tag and address crossbar 70 issues the WAIT reply, it also issues a read request outbound to the target memory control agents 66 that owns the cache line, including the quad identifier (quad ID) and TrID of the original requesting (source) memory control agents 66. At this point, the target control agent 66 gets the target line from its memory board and sends it to the data crossbar 72 with the source quad ID and source TrID attached. Data crossbar 72 uses the source quad ID to route the data to the source control agent 66 where it can be delivered to the requesting processor by observing the source TrID value returned with the data.

Figure 2A:
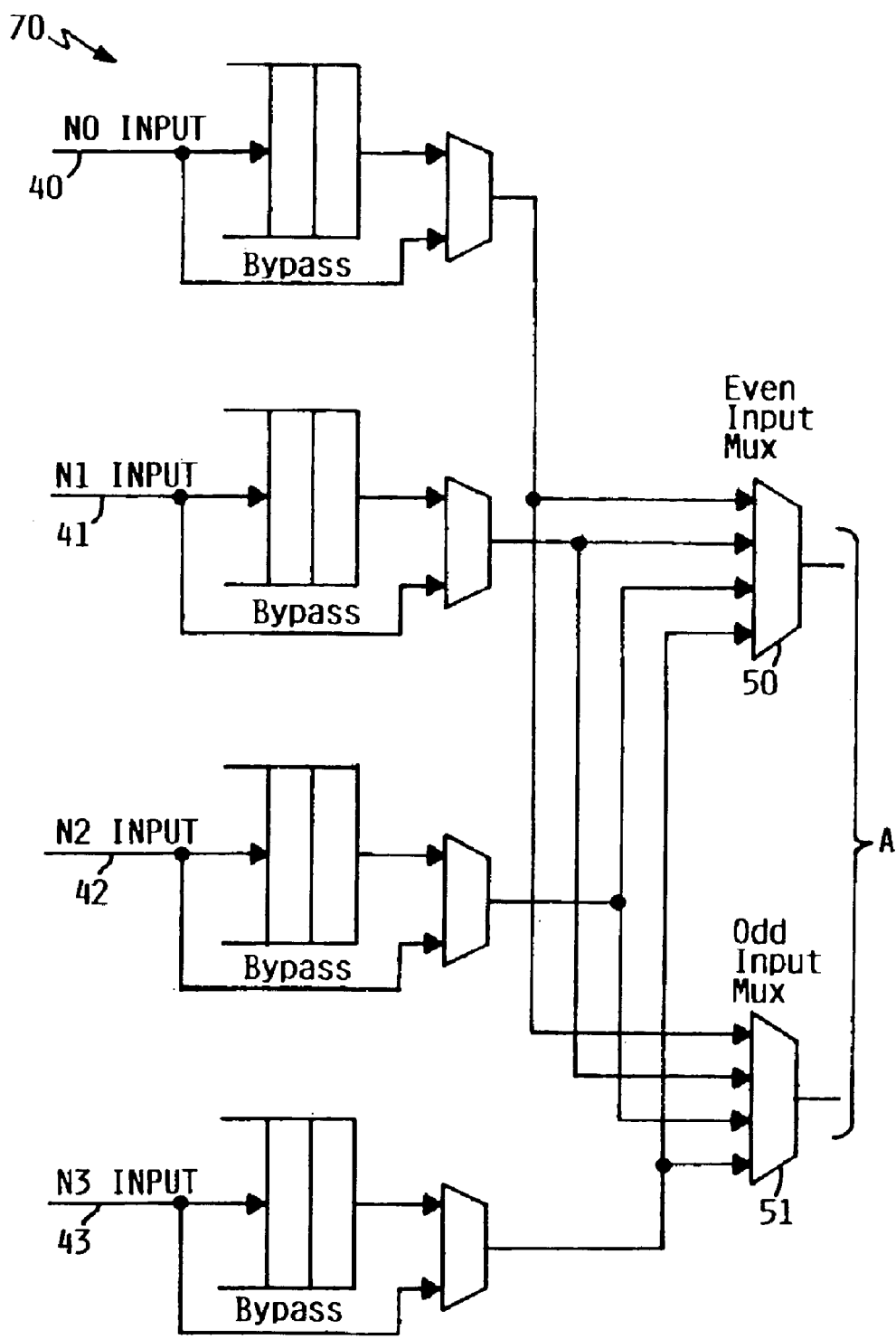
FIGS. 2A–2C is a block diagram of the tag and address crossbar system connecting each quadrant or node in a multiprocessor system in which the invention is used.
Figure 2B:
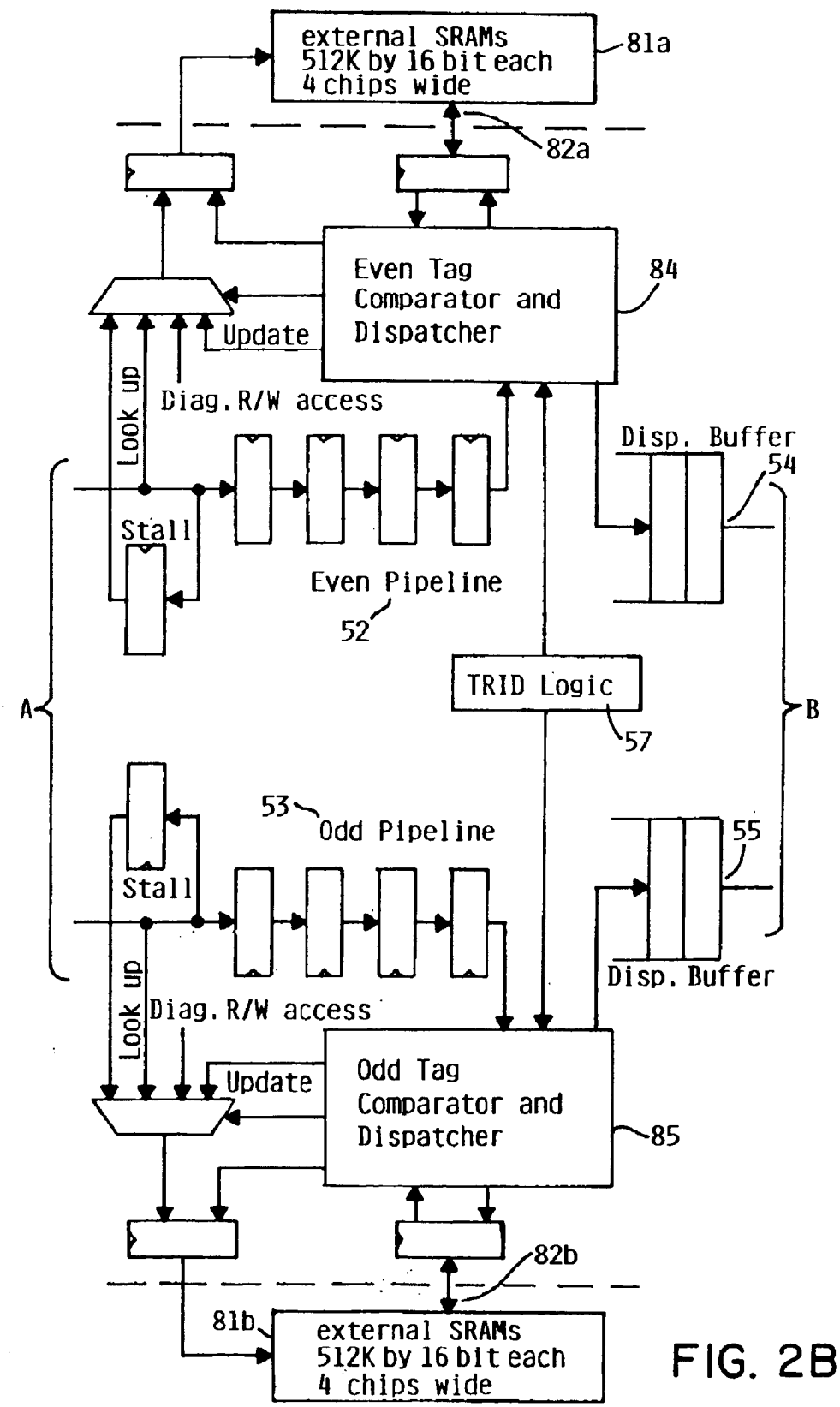
Figure 2C:
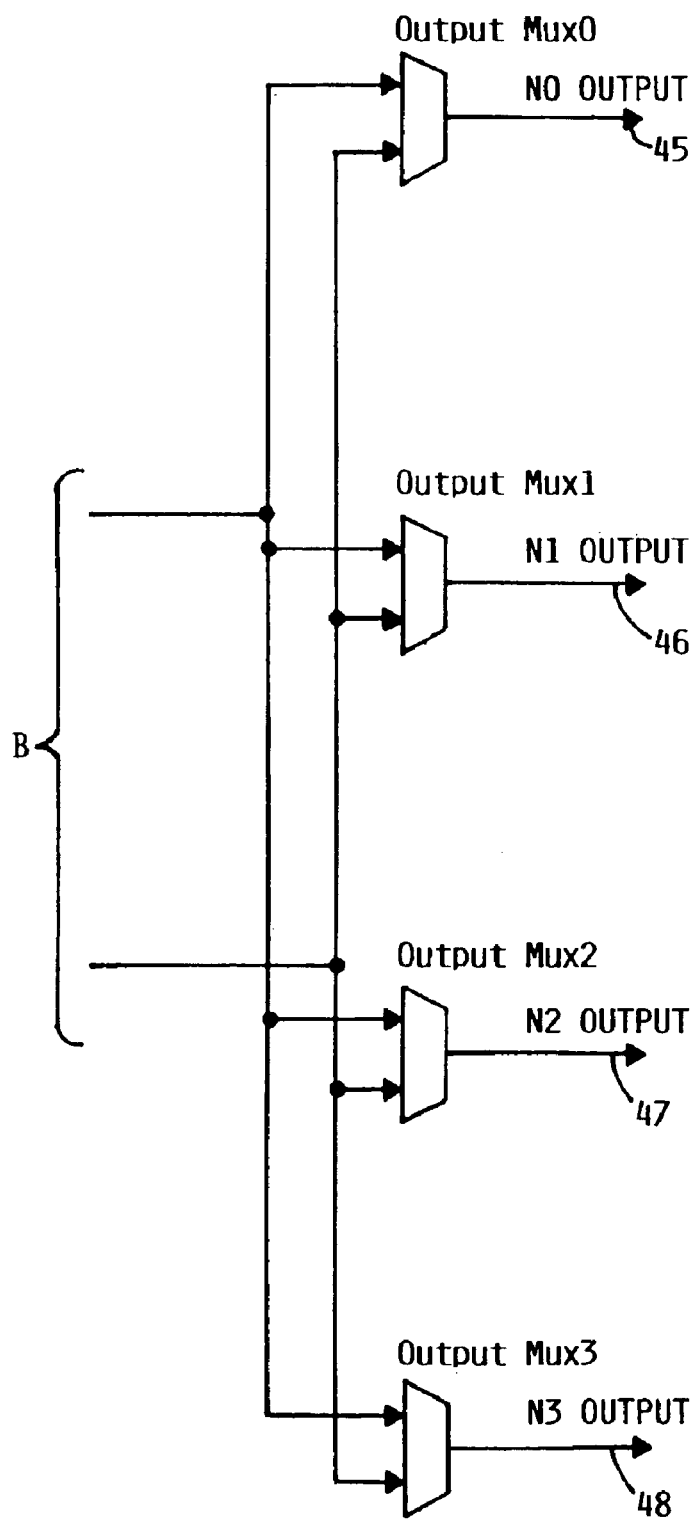

The tag and address crossbar 70 serializes all requests in system 60 into two streams of addresses that it sends to its even and odd tag pipelines shown in FIG. 2. FIG. 2 is presented in three parts as FIGS. 2A, 2B and 2C for clarity but represents one diagram. Each pipeline sends the addresses to the external SRAM Remote Cache Tags (RCT) to look up the global cache state. Since each SRAM component stores RCT entries for only its own port i.e., its own memory control agents 66, the read of all four SRAMs constitutes a read of all four RCTs at that index. Entries from ports that are not a member of the partition making the request are ignored. A cache line is home to (i.e. local to or owned by) exactly one quad 58, so at least one port should yield a tag logic miss (tag mismatch or state of I). The order of the information within a pipeline is always preserved.

When tag logic 57 determines that a RCT entry must be modified (due to state, tag, or ECC fields), the tag and address crossbar 70 schedules a write to the external SRAMs through the write buffer located in tag comparator and dispatcher 84 and 85. To prevent conflicts where a new access could be looked up while a write is pending in the write buffer, the write buffer entries are snooped. A snoop hit (a valid address match) in the write buffer causes the lookup to stall, and the write buffer contents are streamed out to the SRAMs. Lookups that are progressing through the tag pipeline may eventually result in tag writes, so they must be snooped as well. Snoop hits to these entries also cause a stall until the conflict is resolved (including draining the write buffer, if necessary).

The tag and address crossbar 70 manages the direct mapped Remote Caches by allocating the entries and maintaining their system state. If a request requires a RCT entry and that entry already is being used, the old entry must be evicted, this operation sometimes refered to as a rollout in the art. Tag and address crossbar 70 does this by issuing an invalidate or read-invalidate to the control agent 66 that made the request that caused the eviction (also called the instigator). This rollout request that tag and address crossbar 70 makes is in addition to and prior to the original (instigator) request being sent to the target memory control agents 66.

As a system is configured with virtually identical quads 58, the entire system may be partitioned as a single system or up to four separate partitioned systems using the method disclosed. In the preferred embodiment, the maximum total number of quads 58 is four, as configured in FIG. 1. Every port of tag and address crossbar 70 is assigned to one of the four control agent 66 by virtue of its physical connection between agent 66 and crossbar 70. Interconnections between tag and address crossbar 70 and data crossbar 72 to each of control agents 66 are accomplished through bus 71. Shown in FIG. 1 as a connection from tag and address crossbar 70 and data crossbar 72 to the control agent 66 in quad one, the bus is also referred to as a port. Though shown only at quad one, the configuration of bus 71 is duplicated for each quad 58 as can be appreciated by the connections for ports 0, 1, 2 and 3 shown in FIG. 1. Bus 73 is the portion of bus 71 that connects control agent 66 to tag and address crossbar 70. Bus 75 is the portion of bus 71 which connects the data crossbar 72 to each control agent 66. Each of the quads of the system demonstrated in FIG. 1, communicate to the remaining portions of the system through tag and address crossbar 70 as well as data crossbar 72 through channels defined as ports. Ports 0, 1, 2 and 3 are all shown on FIG. 1 interconnecting the crossbar systems with the control agent 66 through input and output portions of each port, interconnecting each crossbar to each given quad. All of the quads 58 in FIG. 1 are connected in a similar fashion, as can be appreciated from the figure, utilizing interconnect bus 71 as shown in port 1 of FIG. 1. The crossbar system including the ports interconnecting the crossbars with each of the quads 58 is essentially a communication pathway connecting the processing nodes. FIG. 2 illustrates internal logic of tag and address crossbar 70 shown in FIG. 1. Input 40 for port 0, input 41 for port 1, input 42 for port 2, and input 43 for port 3 illustrate part of the communications pathway each control agent 66 in each quad or node into tag and address crossbar 70. Likewise, FIG. 2 illustrates port 0 output 45, port 1 output 46, port 2 output 47 and port 3 output 48 also illustrated on the entire system block diagram shown in FIG. 1. Tag look-up registers which function with tag and address crossbar 70 are shown at 81(a) and 81(b). Registers 81(a) and 81(b) are identical except that they are associated with an even pipeline and odd pipeline for tag processing as illustrated in FIG. 2. The dual pipeline design is provided to reduce latency in the system by assigning processing to even numbered tags to the even pipeline and odd numbered tags to the odd pipeline so that simultaneous processing may occur.

Input 40, 41, 42 and 43 are each introduced through a buffer, are operatively connected to both even input multiplexor 50, and odd input multiplexor 51, the appropriate multiplexor (mux) being selected in accordance with the even or odd relationship with the input tag. Each multiplexor 50 and 51 serves to serialize the flow of tags from the four inputs. The outputs of muliplexor 50 and 51 are sent to another multiplexor to be sent ultimately to tag look-up registers 81(a) and 81(b). Even pipeline logic 52 and odd pipeline logic 53 evaluates the tags being presented and the request type to generate an output response and requests for ports that are connected to a defined quad within its partition. The resulting output entries are buffered in the dispatch buffer 54 and 55 which is a first in, first out (FIFO) type buffer. Dispatch buffers 54 and 55 decouples timing variances between the tag logic shown and the output selection logic. Entries are stored in dispatch buffers 54 and 55 in first in, first out order until they can sent to the destination ports, being output 45, 46, 47 or 48, representing one output to each port or quad.

Figure 10:
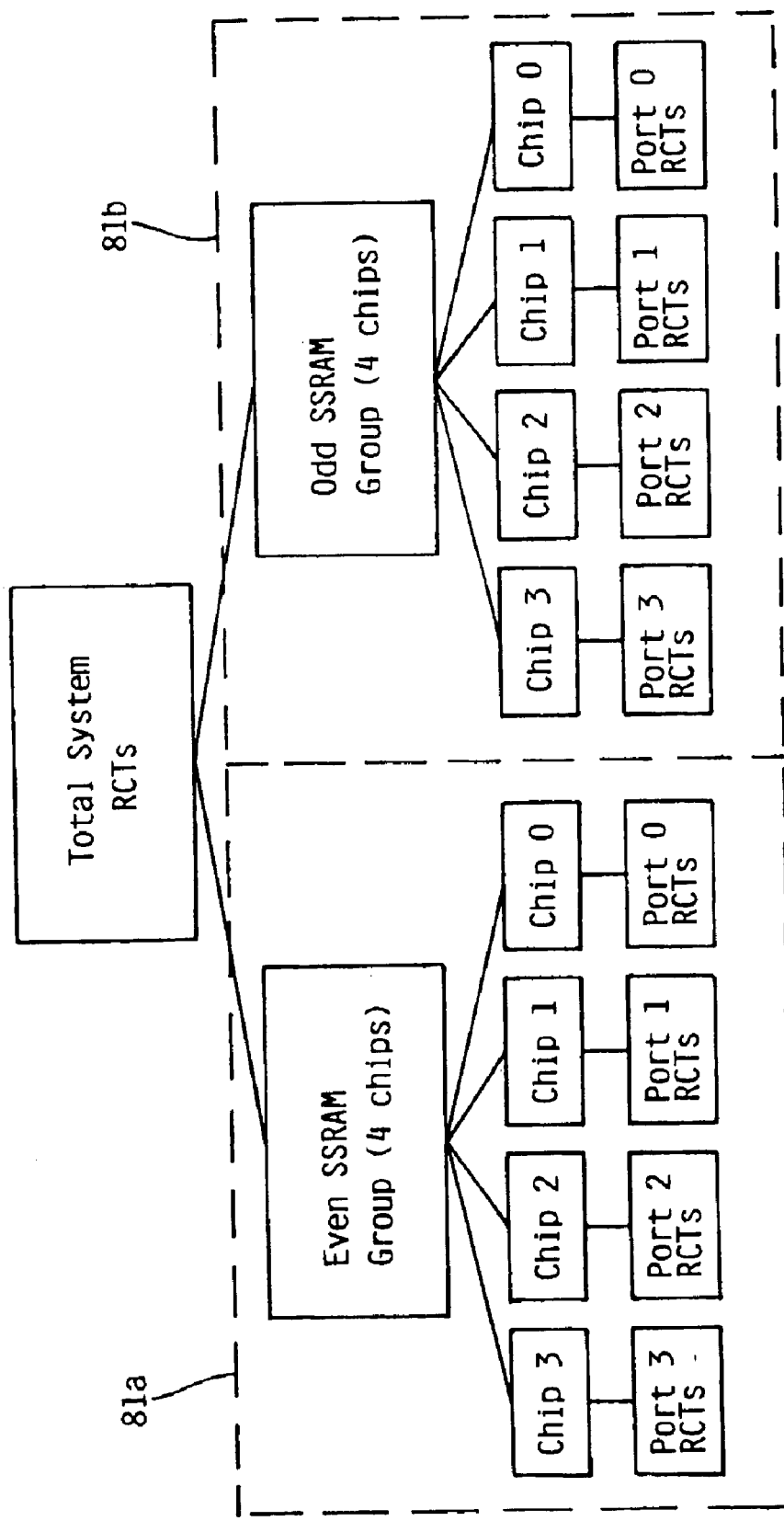
FIG. 10 is a block diagram of the mapping of the remote cache tags.

Tag look-up register 81(a) and 81(b), identical in configuration, are made up of four Synchronous Static Random Access Memory (SSRAM) chips, a total of four each 512 kbits by 16 bits. Tag look-up register 81(a) is connected through line 82(a) to even tag comparator and dispatcher 84. Though shown as one connection in FIG. 2, connection 82(a) is actually four paths, each corresponding to inputs 0, 1, 2 and 3 from each port as described. Register 81(b), connected to the odd tag comparator and dispatcher 85 through connection 82(b) is essentially identical in function. Path 82(b) is likewise comprised of four paths, each corresponding to a port. Tag look-up registers 81(a) and 81(b) are external memory which interfaces with tag and address crossbar 70 used to store the tag and state information for all of the remote cache tags in the entire system. Such information is not directly accessable by memory control agent 66, so all cacheable transactions generated in control agent 66 must access crossbar 70 to access or "snoop" crossbar 70's remote cache tags (RCTs). The physical configuration of register 81(a) and 81(b) is illustrated in the block diagram shown in FIG. 10. As shown in FIG. 10, register 81(a) and 81(b) is implemented with synchronous static random access memory chips (SSRAM) which operate at the internal clock frequency of crossbar 70, being 133 MHz in the present invention. As can be seen also in FIG. 10, there are two groups of external SSRAMs, the groups being divided to odd and even pipelines as shown on FIG. 2. Each group of registers 81(a), 81(b) is split into four "quadrants", with each quadrant representing a physical port of crossbar 70. As there are a total of four ports in the preferred embodiment as shown in the system diagram of FIG. 1, it can be appreciated that each port corresponds to a physical quad in the present invention, as earlier described. Therefore, each port of the RCT interface represents the RCTs for a physical quad's remote cache as is illustrated in FIG. 10 and each quadrant of the tag look-up registers 81(a) and 81(b) contains the tag and state information.

Turning now to the remote cache, the remote cache states, displayed in Table 1 below, shall be described in accordance with the operation of the invention in the prefered embodiment. Tag and address crossbar 70 maintains direct-mapped cache tags for the remote cache for remote addresses. The tag entries have an address tag portion and a state portion (there is also 6 check bits for SEC/DED protection). The possible remote cache state values are: I, S, or M (for invalid, shared, and modified). Each port, (port 0, 1, 2 and 3 as shown in FIG. 1) on the tag and address crossbar 70 has a corresponding even and odd tag SRAM array for these cache tags. For ports that share the same partition ID, the corresponding cache tag quadrants form a collective remote cache tag state. Tag quadrants of two different partitions (if there is at least one node operating in a separately defined partition) have no impact on each other except for the physical sharing of SRAM address pins (which forces accesses to be serialized). The collective tag state for an address is the state of all quadrants at that index in the requester's partition whose tag address matches that address.

As described above, the possible collective states used in the present invention are: invalid, shared, dirty, and modified. For these collective states:

1. invalid means all quads in the partition have either an I state or a tag mismatch at that index;

2. shared means that at least one quad matches its tag and has an S state at the index (but none matches and has an M state);

3. dirty means that exactly one quad matches with an M state and at least one matches with an S state; and 4. modified means that exactly one quad matches with an M state and all other quads are invalid The dirty state implies that memory at the home quad 58 is stale, that all quads 58 that hold it as shared (S) or modified (M) have an identical copy, and that no processor 62 has a modified copy in its internal cache. The tag and address crossbar 70 performs a read access to all four tag quads of the even/odd tag array whenever the even/odd pipeline processes an inbound request for an even/odd memory address. Processing of the request and the resultant lookup may require an update to the tags. The cache line is protected against subsequent accesses to the cache line while a potential update is pending. Memory-Mapped Input/Output (MMIO) addresses and requests to non-memory targets do not require a lookup, but still consume a pipeline stage.

Tag and address crossbar 70 throttles inbound requests using the credit/release mechanism. Control agent 66 assumes that a "credit" number of requests can be sent and will not allow further requests when the credits are expended. Crossbar 70 returns the credit with a credit release, which allows the credit to be re-used.

Address conflicts in the write buffer or the tag pipelines of the tag and address crossbar 70 can stall progress in the tag pipelines until the conflict is resolved. A lack of TrIDs may delay movement of a pipeline entry (token) from the tag logic into the dispatch buffer 54. If the dispatch buffer 54 or 55 is full, a new entry cannot be entered into the buffer. There are also certain errors (such as SEC correction) that stall the pipeline for one clock. For these reasons, a pipeline entry could be delayed at the input to the dispatch buffer 54 or 55 and thus cause the pipeline to become blocked. In the case of insufficient TrIDs, the entry is delayed for a period of time programmable) to wait for a TrID to become available. If the delay period expires, the entry will be retried instead. In this event, the token is converted to a retry and placed into the dispatch buffer 54 or 55 as a response to the requester (errors are treated in a similar manner: replacement of the original token with an error token). Conversion to a retry or error allows the entry to be placed into the dispatch buffer 54 or 55, and the pipeline can then advance. Such a situation cancels any external tag updates that may have been scheduled or TrIDs that may have been allocated. If an entry is delayed at the input to the dispatch buffer 54 or 55, any external tag read operations need to be queued when they return to crossbar 70. These queued read results (called the stall collectors) must be inserted back into the pipeline in the correct order when the dispatch buffer 54 or 55 becomes unblocked.

Inbound requests are throttled only by the credit/release mechanism. Inbound responses are not defined. Outbound requests are throttled by the availability of a TrID in the target control agent 66 (as determined in the tag and address crossbar 70's TrID allocation logic). Outbound responses have no throttling mechanism and the control agent 66 accepts any and all crossbar 70 responses. All outbound responses or requests in an entry in dispatch buffer 54 or 55 must be referred to their respective output simultaneously. Therefore, dispatch buffers 54 and 55 must compete for availability of output 45, 46, 47 and 48 if they conflict. Furthermore, an output response to an output port may be accompanied by a rollout (eviction) request, and both must be sent to that output port, rollout first.

Tag and address crossbar 70 receives requests from the control agent 66 and reacts based on the state of the cache line in each quad's remote cache tag. The aggregate of the quad remote cache (RC) states is called the global remote cache (RC) state. In this table, the combinations of legal state values is abbreviated as 3 characters of I, S, and M as described earlier. The second column is the state of the requester's RC tag, the third column is the state of other quads except for the owner, and the fourth column is the state of the owning quad. The global RC state has the state name given in column 1 of table 1. Local requests should always mismatch or have an I state. It should be appreciated that local requests imply that the requester is in state I since local addresses are not cached in the remote cache. In rows where the Req state is I, the line is not present in that quad's remote cache. The I state means no tag match occurred, the state was I, or that the port is not a member of the partition making the request. All four of the Dirty states imply that the processors in the quad holding the line in the M state have unmodified data in their on-chip (L1/L2) caches.

TABLE 1

Global Remote Cache State Definitions

| State Name | Req | Sharer | Owner | Comment | Memory |
| --- | --- | --- | --- | --- | --- |
| Invalid | I | I | I | line is Home | Clean |
| SharedMiss | I | S | I | line is clean shared, but misses its own RC | Clean |
| SharedHit | S | I | I | line is clean hit, but exclusive to requester's RC | Clean |
| SharedBoth | S | S | I | full sharing | Clean |
| DirtyMiss | I | S | M | line is modified in another RC, but only shared in processor caches | Stale |
| DirtyHit | S | I | M | requester aleady caching, no $3^{rd}$ party sharers | Stale |
| DirtyBoth | S | S | M | full sharing and modified in owner's RC | Stale |
| DirtyMod | M | S | I | requester is also owner | Stale |
| ModMiss | I | I | M | exclusively owned by another quad | Stale |
| ModHit | M | I | I | requester is also owner | Stale |

When the requester is the owner, table 1 assigns Req the value M and shows the owner as state I. Such state names are used in the figures to demonstrate how tag and address crossbar 70 reacts to bus 73 requests. It should be also appreciated that bus 73 is illustrative of each bus of tag and address crossbar 70 for each port shown in FIG. 1.

FIG. 4 illustrates cached reads and read-invalidates. FIG. 4 is presented in four parts as FIGS. 4A, 4B, 4C and 4D for clarity but represents one diagram. FIG. 5 illustrates uncached reads. FIG. 5 is presented in two parts as FIGS. 5A and 5B for clarity but represents one diagram. FIG. 6 illustrates uncached writes. FIG. 6 is presented in two parts as FIGS. 6A and 6B for clarity but represents one diagram. FIG. 7 illustrates reads and writes to MMIO, CSRs, and non-memory targets. FIG. 8 illustrates rollout requests. FIG. 8 is presented in two parts as FIGS. 8A and 8B for clarity but represents one diagram. All of the mnemonics for the fields used for all the input and output buses for crossbar 70, (shown in one instance as bus 73 in FIG. 1), are illustrated in FIG. 9 and may be used as references in the review of the figures utilizing the mnemonics in the illustration of the operation of the prefered embodiment. FIG. 9 is presented in three parts as FIGS. 9A, 9B, and 9C for clarity but represents one diagram. Reference will now be made to such figures as the operation of the preferred embodiment will be illustrated.

FIGS. 4, 5, 6, 7, 8 and 9 illustrate the operation of the preferred embodiment and can be used to understand the actual operation of the method and the system disclosed herein. Considering FIG. 4, the table illustrated describes various states of cached reads and read invalidates which fully explain the implementation of the present invention. FIG. 4 may be used to illustrate any data requests initiated by any of the four ports, and used as an example to define the results and the response to all other ports for a given input. Column 101 of FIG. 4 contains the various types of bus requests. Column 101 includes a request for a cached read to a local address (LCR), a requested for a cached read to a remote address (RCR), a request for a cached read invalidate to a local address (LCRI); and a request for a cached read-invalidate to a remote address (RCRI). An illustrative example will be used to demonstrate the operation of the invention assuming that the bus 73 request in column 101 is originating in port 1, thereby relating to input 41 as shown in FIG. 1.

For the purpose of the present example, column 101 represents input 41 on FIG. 2. In such a case, for each global remote cache state in column 102 the tag and address crossbar 70 response to such a request is given in column 103, and such response is directed to the output port to which the request was made. In the present example, a request on input 41 corresponds to output 46 handling the response to the request. Likewise, columns 104, 105 and 106 refer to output 45, 46, 47, or 48 in FIG. 2, as they relate to home, sharer or owner. In the present example, the request to home in column 104 is one of the other outputs other than 46. A request to sharers in column 105 necessarily excludes the request to home quads in column 104. Home specified in column 104 is the quad where an address is local, or means an address is local to the particular quad. Column 106 depicts the particular output in the example to the quad which is defined as the owner of the data in question. In the example used for a request received from quad 1, column 106 is by definition to one of the other outputs other than output 46 which is associated with port 1. Column 107 defines the next global remote cached state and column 108 defines whether the remote cache allocate and/or rollout should be associated with the particular bus request in column 101. A yes in column 108 means a relocation may be necessary, which may further mean that a rollout of the existing line is required.

FIG. 5 is a table illustrating uncached read requests with similar vertical column definitions as those depicted in FIG. 4. FIG. 5 provides the various states and responses for the defined quads for each request for a local uncached read and for requests for a remote uncached read. FIG. 6, once again with similar column headings, provides defined solutions for a request for a local uncached partial write, request to crossbar 70 or for remote uncached partial write requester for a local uncached full line write request or for a remote uncached full line write. In the preferred embodiment, a full cache line is defined as 32 bytes, being the unit of coherency used in the embodiment. Partial lines are requests made in the system which involve less than 32 bytes and are, accordingly, considered partial lines.

FIG. 7 is a table illustrating reads and writes to memory mapped I/O locations, CSR's and non-memory targets, the definitions for which are contained in the mnemonic descriptions contained in FIG. 9. FIG. 8 is a table that defines the requests that must be sent to the home, sharer, and owner nodes to accomplish an eviction of a cache line. If column 108 of FIG. 4 shows a YES for the (instigating) request and there is a valid pre-existing entry in the remote cache, then that entry must be evicted in order to make room for caching of the (instigating) request. Thus, FIG. 8 defines activity associated with a different memory location (but the same cache entry), and occurs as a side effect of the (instigating) request. FIG. 9 contains the reference mnemonics used in the Figures.

In FIGS. 4 through 8, reference is made occasionally to n*RCI. n is an integer equal to the number of operations or requests that might be required for a particular operation. An example using FIG. 4 will be provided which illustrates its use in the operation of the invention Taking line 109 on FIG. 4 as an example, in a request for a cached read-invalidate to a local address, column 102 provides for the instance of a shared miss. Column 103 is provided the term GO Inv=n, column 104 providing a blank and column 105 providing the definition of a request to sharers as being n*RCI. In this example, a processor has made a request for a local address, the data of which it intends to modify. To maintain coherency, it requests data and wants all other copies of such data in the system to be invalidated because it plans to "own" such data. However, in the example utilizing a shared miss, there are other quads within the system that have a cached read only copy in addition to the copy in the requestor's local memory. For this reason the processor can go straight to memory for such data because the only other copies are shared copies. Therefore, what is in memory is not stale by definition. In the example, the processor reads the data as suggested in column 103 where the response to the requestor is defined as GO, meaning that the processor may continue the process of having the data looked up because the anticipated data to be read is valid and that processor is clear to use the data.

In continuing the operation defined in the present invention, the remaining quads which were earlier sharing the data must be informed that the data subject to the present example is no longer valid and such quads no longer have valid copies of same. Accordingly, the invention provides that such memory is defined now as stale because of the operation. Column 105 provides that n copies of an RCI (which means a remote cache line invalidate), are sent to other sharers. Each quad (a total of n quads) earlier sharing said data is now informed that the cache line operated upon is now invalid. In the example at line 109, column 103 indicates the number of invalidate acknowledgments to be expected in the system (inv=n). Accordingly, inv=n matches the n*RCI. The system operation defined in the example is not complete until data is received and n invalidate acknowledgments are returned. In the example, it can be appreciated that there is only one response to the requesting quad since there is only one requesting quad. In line 109, there can only be one request to the home quad in that there is only one home quad as well as one request to the owner quad because there is only one quad defined as the owner. In column 105 it can be appreciated in the example given and in the preferred embodiment disclosed that there can be up to three sharing quads since a total of four quads is provided in the embodiment.

With the illustrative example it can be appreciated that FIGS. 4, 5, 6, 7 and 8 provide a complete operating scheme and control protocol which precisely defines the operation of the apparatus and method defined herein. The Q/A column of FIG. 9 indicates whether the mnemonic is associated with a request (Q=request) or a reply (A=answer).

The present invention can be employed in any multiprocessor system that utilizes a central control device or system to communicate between a group of microprocessors. The invention is most beneficial when used in conjunction with a tag and address crossbar system along with a data crossbar system which attaches multiple groups of processors employing non-uniform memory access or distributed memory across the system. The preferred embodiment systems and method which allows maintaining cache coherency in a multinode system through tracking data states within the data tag and address crossbar controller in such systems as shown and described in detail is filly capable of obtaining the objectives of the invention. However, it should be understood that the described embodiment is merely an example of the present invention, and as such, is representative of subject matter which is broadly contemplated by the present invention.

For example, the preferred embodiment is described above in the context of a particular system which utilizes sixteen microprocessors, comprised of quads of four separate groups of four processors, with each quad having a memory control agent which interfaces with the central controller crossbar, having memory boards allocated to the quad and for which the preferred embodiment functions to communicate through other subsystems to like controllers in the other quads. Nevertheless, the present invention may be used with any system having multiple processors, whether grouped into "nodes" or not, with separate memory control agents assigned to control each separate group of one or more processors when such group of processors requires coherence or coordination in handling data read or write commands or transaction requests, within a multi-node system.

The present invention is not necessarily limited to the specific numbers of processors or the array of processors disclosed, but may be used in similar system design using interconnected memory control systems with tag and address and data communication systems between the nodes to implement the present invention. Accordingly, the scope of the present invention fully encompasses other embodiments which may become apparent to those skilled in the art.

We claim:

1. A method for maintaining cache coherence in a multiprocessor system having a plurality of nodes, each node having at least one cache, a memory device local to the node, and at least one processor device, the method comprising:

storing information regarding the state of data exclusively in an interconnect communicatively connecting said nodes with one another, such that the interconnect is a sole repository of cache coherence information within the multiprocessor system;

checking said stored information to determine the location of the most current copy of a requested portion of data, in response to a request by a requesting node for the requested portion of data;

retrieving said current copy of requested portion of data and directing said data to the requesting node;

checking said stored information to determine the location of the requested data portion; and simultaneous to the retrieval of said current copy of the requested portion of data, directing the system to send said requested data portion to the requesting node without going through said interconnect.

2. A multiprocessor computer system comprising:

a plurality of nodes, each node including at least one processor and portion of a shared distributed system memory coupled to said processor; and an interconnect both communicatively connecting said nodes with one another and exclusively storing locations of the most current copies and state information of data stored in the memory of the nodes such that the interconnect is a sole repository of cache coherence information within the multiprocessor computer system, said interconnect simultaneously provides requests to first and second nodes, wherein the results of the request from the second node is communicated to the first node without going through said interconnect.

3. The multiprocessor system of claim 2, wherein each node includes memory accessible to it without communications through said interconnect, and memory accessible remotely by others of the nodes.

4. The multiprocessor system of claim 2 wherein further said interconnect stores information for determining which nodes or processors are storing copies of one or more identified data in each said node's memory.

5. The multiprocessor system of claim 2 wherein said interconnect compares requested data with the stored location and the state of data in the nodes, directs requested data to the requesting node, and sends requests for additional data to other nodes for which said device stores the location of data.

6. The multiprocessor system of claim 5 wherein said interconnect includes a dispatch buffer operatively connected to the nodes, and issues requests for information related to the state of identified data to other nodes simultaneously with the communication of data to a target node.

7. The multiprocessor system of claim 5 wherein said interconnect includes a first pathway storing the location and state of data in the nodes, and a second pathway communicating the data requested by said target node.

8. A method for maintaining cache coherence in a multiprocessor system having a plurality of nodes, each node having at least one cache, a memory device local to the node and at least one processor device, the memory and processor device being coupled to form a complete subsystem, the method comprising:

storing information regarding the state of data exclusively in a first part of an interconnect communicatively connecting said nodes with one another, such that the interconnect is a sole repository of cache coherence information within the multiprocessor system;

said first part checking said stored information to determine the location of the most current copy of a requested portion of data, in response to a request by a requesting node for data;

said first part directing a second part of the interconnect to forward the said most current copy of said data to the requesting node; and said second part retrieving said current copy of requested portion of data and simultaneously directing said data to a target node without going through said interconnect.

9. The method of claim 8 wherein said first part checking said stored information to determine the location of the most current copy of a requested portion of data, in response to a request by a requesting node for data, comprises:

storing information about the state of data in each node in said first communications pathway;

checking the state of requested data stored in each node upon request for the data from a node by reading the said stored information and determining the desired state defined as the most current copy of said stored data.

* * * * *